US008065782B2

(12) United States Patent
Lee

(10) Patent No.: US 8,065,782 B2
(45) Date of Patent: Nov. 29, 2011

(54) ELECTROMOTION TYPE AUTOMATIC CLIP-EJECTING APPARATUS

(76) Inventor: Young Woo Lee, Seoul (KR)

( * ) Notice: Subject to any disclaimer, the term of this patent is extended or adjusted under 35 U.S.C. 154(b) by 415 days.

(21) Appl. No.: 12/412,255

(22) Filed: Mar. 26, 2009

(65) Prior Publication Data

US 2009/0250483 A1 Oct. 8, 2009

(30) Foreign Application Priority Data

Apr. 8, 2008 (KR) ........................ 10-2008-0032429

(51) Int. Cl.
*B23P 11/00* (2006.01)
*B65D 83/00* (2006.01)
*B65D 85/00* (2006.01)

(52) U.S. Cl. ........................ 29/243.56; 221/69; 206/340

(58) Field of Classification Search ............... 29/243.56; 221/13, 69, 79, 86–89, 153, 186, 187, 189, 221/208, 210, 217, 231–233, 236, 237, 247–252, 221/258, 265, 272–277; 206/214, 215, 229–231, 206/338–347
See application file for complete search history.

(56) References Cited

U.S. PATENT DOCUMENTS 7,341,145 B2 * 3/2008 Vandenbroek et al. ....... 206/339
2008/0041874 A1 * 2/2008 Attaway .......................... 221/70
* cited by examiner

*Primary Examiner* — David B Thomas
(74) *Attorney, Agent, or Firm* — Michael Best & Friedrich LLP

(57) ABSTRACT

In an electro-motion type automatic clip-ejecting apparatus, when paper to be bound is inserted into the apparatus after a large number of clips are charged in the clip magazine, each clip is simultaneously ejected from the clip magazine so that a binding operation is performed so that it is possible to conveniently use the clip ejecting apparatus by only one hand of the user. The apparatus includes a wheel movement member and a clip ejecting member. The wheel movement member includes a pole, a spring for providing elastic force, and a pole movement bar for performing a linear movement so that the pole movement bar is interlocked with the pushing rack gear. The pole is interlocked with the pole movement bar according to linear movement of the pole movement bar. The clip ejecting member includes a spar gear, a fixed gear, and a pushing rack gear.

5 Claims, 7 Drawing Sheets

ELECTROMOTION TYPE AUTOMATIC CLIP-EJECTING APPARATUS

BACKGROUND OF THE INVENTION

1. Field of the invention

The present invention relates to an electro-motion type automatic clip-ejecting apparatus, and more particularly to an electro-motion type automatic clip-ejecting apparatus, in which paper to be bound is inserted into a front opening of the clip magazine, which is shaped like a wheel and is charged with a large number of clips, and simultaneously, each clip is automatically ejected from the clip magazine, so that the convenience in using the clip ejecting apparatus can be improved remarkably.

2. Description of the Prior Art

A conventional clip ejecting apparatus for binding a plurality of pieces of paper is operated by a passive pushing or pressing manner so that it is inconvenient to use the convention clip ejecting apparatus.

That is, the conventional clip ejecting apparatus (refers to a clip dispenser) is operated in such a manner that the dispenser is slanted frontward so as to allow clips to flow frontward whenever there is a need for binding paper, and a user's finger makes direct contact with a pushing bar of an upper part of the dispenser and pushes each clip frontward.

Accordingly, whenever paper is bound, the above-described operation is repeatedly performed. Therefore, is it a great inconvenience because of the large amount of force required for pushing each clip, and in addition, each clip has to always flow frontward whenever binding papers together.

SUMMARY OF THE INVENTION

Accordingly, the present invention has been made to solve the above-mentioned problems occurring in the prior art, and the present invention provides an electro-motion type automatic clip-ejecting apparatus, which performs a binding operation in such a manner clips are automatically ejected from the clip magazine charged with a large number of clips simultaneously when paper to be bound is inserted into the clip ejecting apparatus so that the user can use the clip ejecting apparatus with only one hand.

In accordance with an aspect of the present invention, there is provided an electro-motion type automatic clip-ejecting apparatus capable of binding a plurality of pieces of paper inserted through an opening by using a plurality of clips charged within the apparatus, the apparatus including: a body part including a supporting member, which is seated on a floor surface and has the opening formed at one end of the supporting member, the opening having a plate spring, and a wheel cover member, which has a circular shape, is installed at the supporting member, and has a clip ejecting hole communicating with the opening and an opening/closing member, which is selectively opened; a wheel, which is installed within the wheel cover member in such a manner that the wheel is selectively rotated and has a plurality of clip seating holes for allowing a large number of clips to be charged within the wheel, the clip seating holes being formed along a body of the wheel; a switching means for supplying power from a power unit to the apparatus as a contact part included in the opening is pressed by an external force; a driving means installed on one side of a partition wall within the wheel, the driving means including a driving motor driven by power applied through the switching means, a plurality of reduction gears connected with the driving motor, and a driving gear, which is rotated by receiving driving force from the driving motor by means of the reduction gears and has one side connected with one end of an arm; a clip ejecting means including a spar gear, which is assembled with a box assembled with another end of the arm and performs a linear movement, a fixed gear, which is fixedly installed on an upper side of the spar gear in a state where the spar gear is engaged with the fixed gear, and a pushing rack gear, which is installed on a lower side of the spar gear in a state where the pushing rack gear is engaged with the spar gear and performs a linear movement in such a manner that the pushing rack gear is interlocked with the spar gear, and allows an end of the pushing rack gear to press a clip charged in a position corresponding to the opening, thereby performing a binding action; a wheel movement means including a pole movement bar, which is shaped like a bar having locking jaws formed at front and rear ends of an upper surface of the bar, is installed on a lower side of the pushing rack gear, performs a linear movement in such a manner that the pole movement bar is interlocked with the pushing rack gear by means of a protuberance formed at a lower surface of the pushing rack gear, a pole, which is installed on a lower side of a rear end of the pole movement bar, and is interlocked with the pole movement bar according to linear movement of the pole movement bar so that an end of the pole is locked with a latch groove of the wheel, thereby moving the wheel, a spring for providing elastic force applied toward an upper side, the spring is installed at the end of the pole; and a switching releasing means including a cam, which is installed at another side of the partition wall, which corresponds to the driving gear so as to be interlocked with the driving gear and has a recess part formed on an outer circumferential surface of one side of the cam, and a pair of latches, which is formed in such a manner that a primary lever shaped like "|" and a secondary lever shaped like "└" are overlapped with each other, and allows each end of the primary and secondary levers to makes contact with the outer circumferential surface of the cam so that each another end of the primary and secondary levers selectively converts the switching means to an OFF-state according to rotation of the cam.

It is preferable that the switching means includes: a touch lever, which is shaped like "┘" and has a contact part formed at one end of the touch lever in such a manner that the contact part is positioned at a side of the opening and an elongated hole formed at a body of the touch lever so as to allow a guide protuberance to extend through the elongated hole; a switching lever, which has one side positioned within the wheel in a state where the one end is assembled with the touch lever and another side, which is shaped like "┘" and has a locking groove formed at one end of the another side of the touch lever and an upper end of the another side, which selectively makes contact with the secondary lever; a switch having a lever formed at one side of the switching, the lever being selectively switched according forward/backward movement of the switching lever; and a return spring, which has both ends assembled with the partition wall of the wheel and the switching lever, respectively, so that the return spring releases a switched state and simultaneously allows the switching means to be retuned to its original position.

It is preferable that a contact protuberance is formed at each end of the primary and secondary levers, which makes contact with the recess part of the cam, a switching protuberance, which make contact with a locking protuberance stopped by the locking groove of the switching lever and a switching protuberance making contact with the lever of the switch are formed at another end of the primary lever, and a contact protuberance, which makes contact with an upper end of the switching lever, is formed at another end of the secondary lever.

It is preferable that the driving motor of the driving means is controlled to be rotated only once according to each single binding request, and thus, the driving gear connected with the driving motor is accurately rotated only once so that only one clip is used in binding according to each single binding request.

It is preferable that a plurality of backlash preventing grooves are formed along an outer circumferential surface of the wheel with a predetermined interval, and a backlash preventing member, which is selectively assembled with each backlash preventing groove so as to prevent backlash of the wheel, is installed at one side of an outer circumferential surface of the wheel cover member.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE EXEMPLARY EMBODIMENTS

Hereinafter, a gun-type continuously-clip ejecting apparatus according to the present invention will be described in detail.

Figure 1:
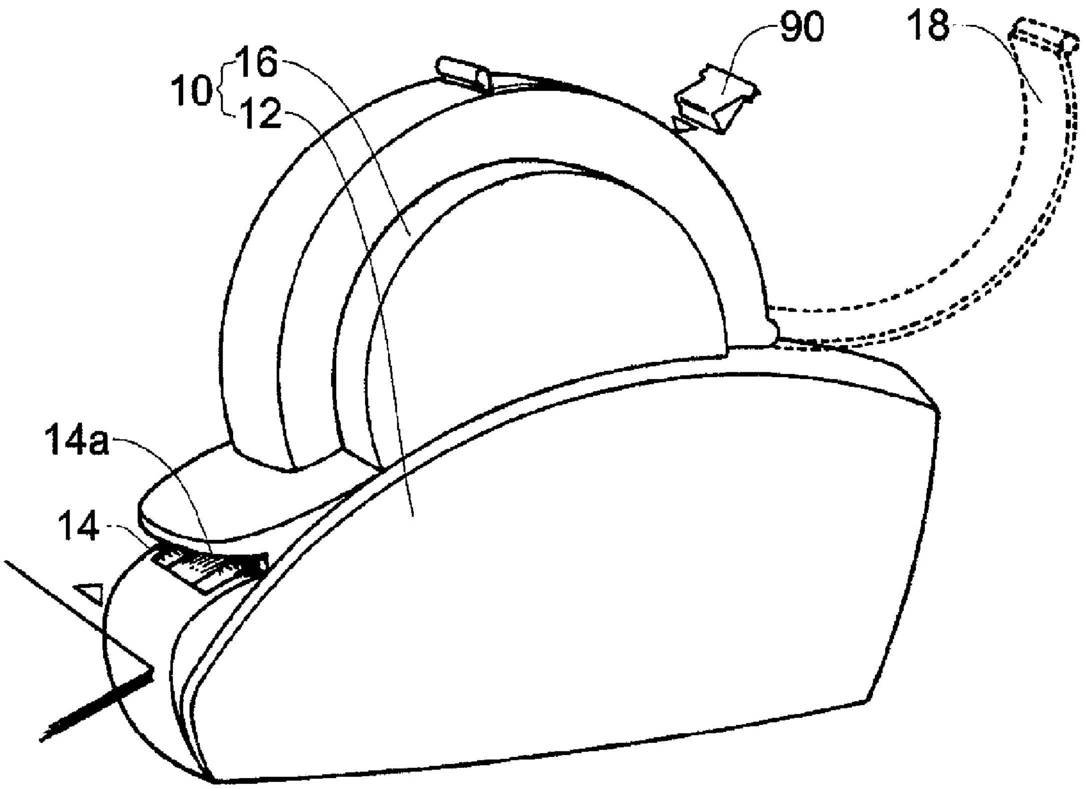
FIG. 1 is a perspective view of an electro-motion type automatic clip-ejecting apparatus according to the present invention.
Figure 2A:
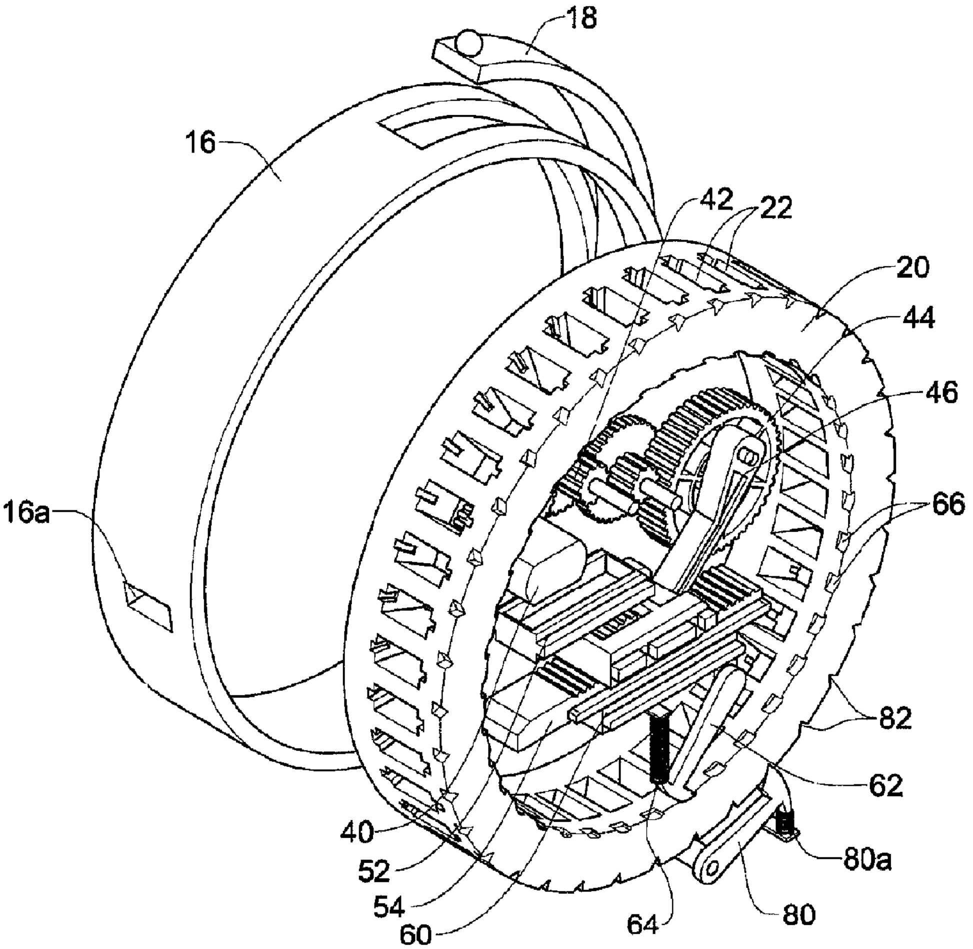
FIG. 2*a* is a partial perspective view based one side of an electro-motion type automatic clip-ejecting apparatus according to the present invention.
Figure 2B:
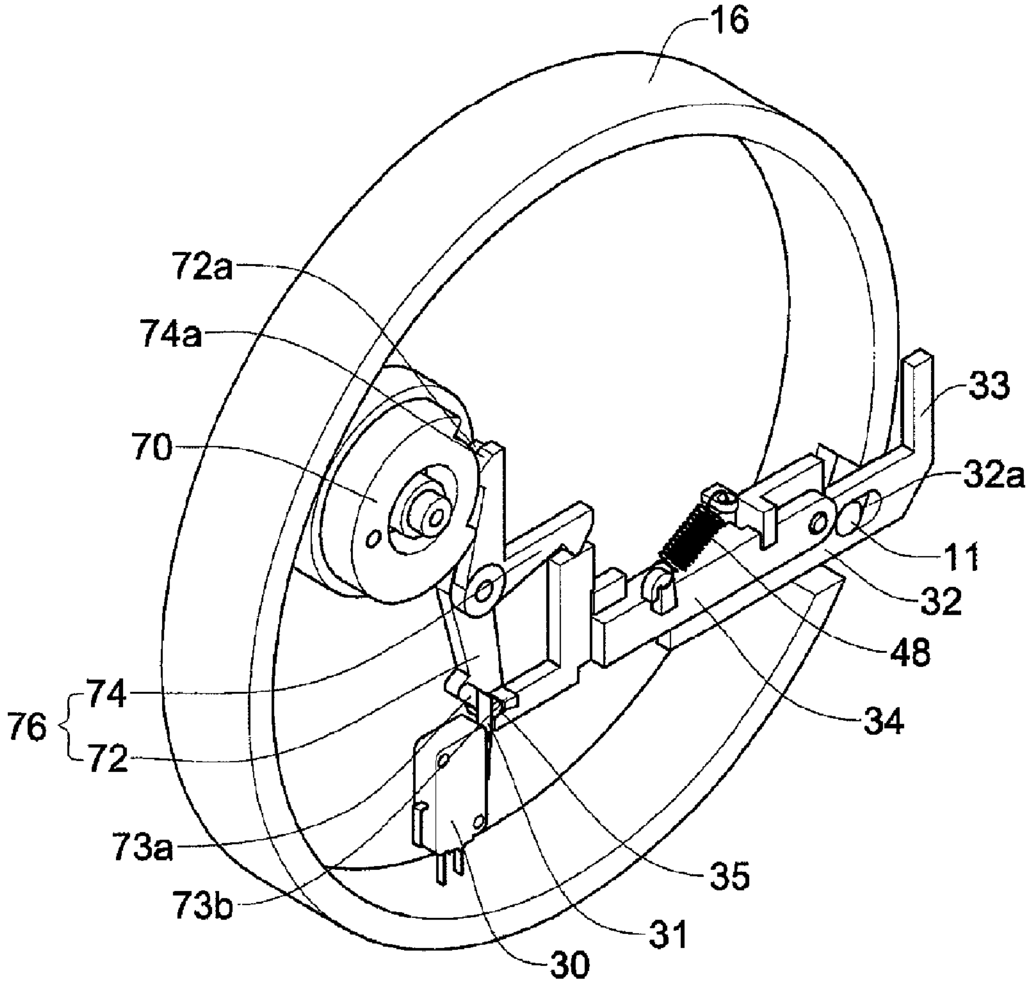
FIG. 2*b* is a partial perspective view based the other side of an electro-motion type automatic clip-ejecting apparatus according to the present invention.
Figure 3A:
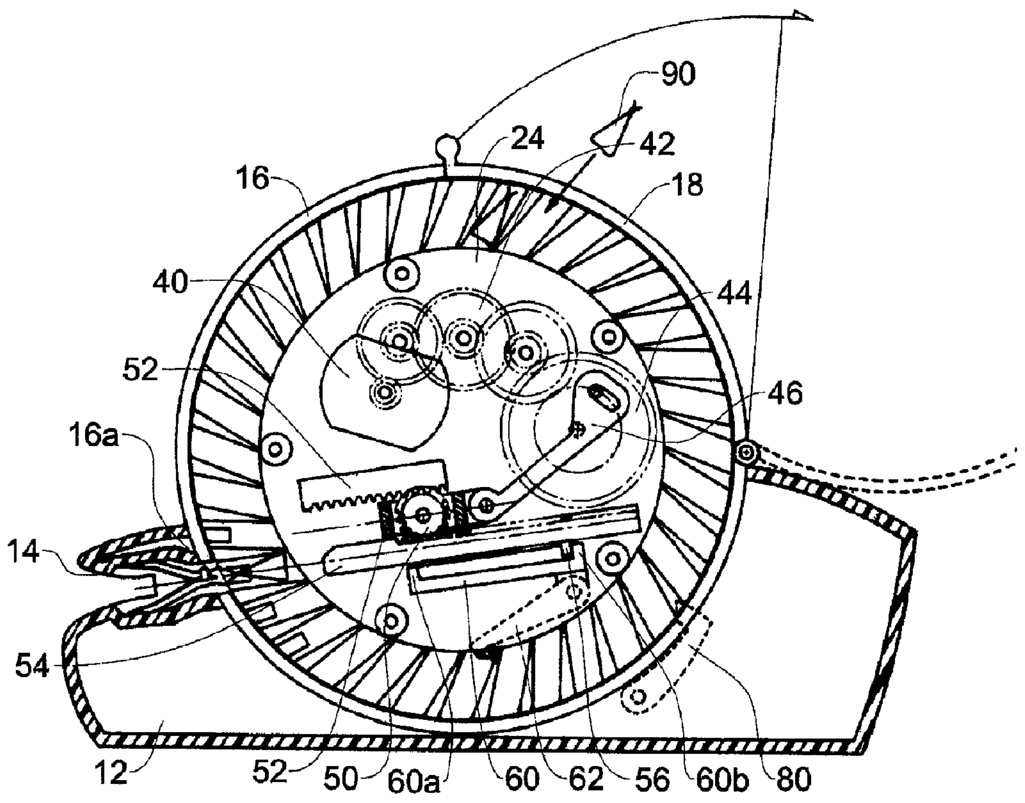
FIGS. 3*a* to 3*c* are sectional views of one side of an electro-motion type automatic clip-ejecting apparatus according to the present invention in the operational state.
Figure 3B:
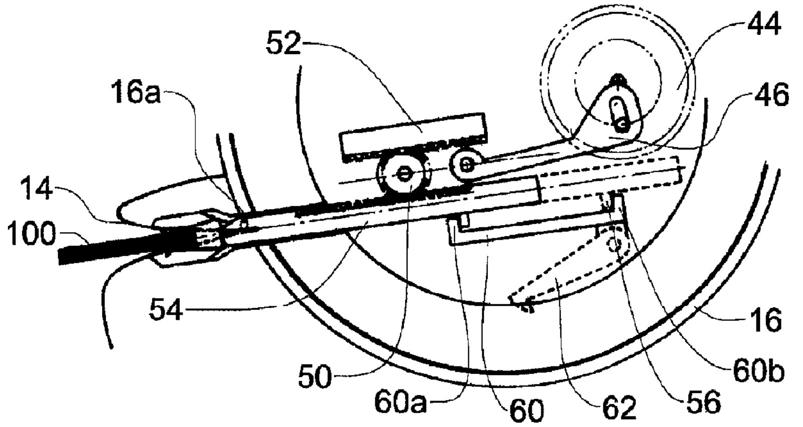
Figure 3C:
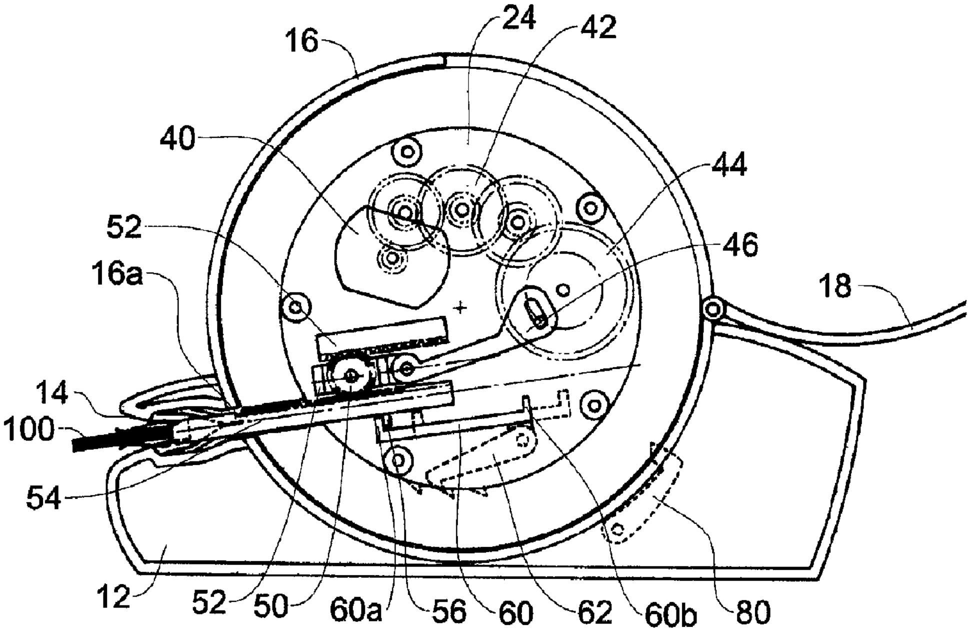

FIG. 1 is a perspective view of an electro-motion type automatic clip-ejecting apparatus according to the present invention, FIG. 2*a* is a partial perspective view based one side of an electro-motion type automatic clip-ejecting apparatus according to the present invention, and FIG. 2*b* is a partial perspective view based the other side of electro-motion type automatic clip-ejecting apparatus according to the present invention. Also, FIGS. 3*a* to 3*c* are sectional views of one side of an electro-motion type automatic clip-ejecting apparatus according to the present invention in the operational state, and FIGS. 4*a* to 4*d* are sectional views of the other side of an electro-motion type automatic clip-ejecting apparatus according to the present invention in the operational state.

In the electro-motion type automatic clip-ejecting apparatus according to the present invention, a binding operation by using clips 90 is automatically performed by operating a driving motor 40 according to a need for binding predetermined number of documents or paper 100 in a state where a large number of clips 90 are charged within the body of the apparatus.

First the electro-motion type automatic clip-ejecting apparatus includes a body part 10, which includes a supporting member 12 and a wheel cover member 16. The supporting member 12 is seated on a floor surface when it is used and has an opening 14 formed at one side thereof, which has a leaf spring 14*a*, which is a V-shape and widens each clip 90 when a binding operation is performed by using the clip 90 charged with the apparatus. Also, the wheel cover member 16 has a roughly circular shape, has a body formed integrally in such a manner that a part of the wheel cover member is embedded within the supporting member 12, and has a clip ejection hole 16*a* communicating with the opening 14 and an opening/closing member 18, which is formed at one side of the wheel cover member and has a structure, which can be selectively opened or closed.

At this time, a battery (not shown) for applying predetermined power required for automatic ejection of the clip 90 to the apparatus is received within the body part 10.

Also, a wheel 20 shaped like a circle is rotatably installed within the wheel cover member 16, and a plurality of clip seating holes 22 are formed along the body of the wheel 22 so that a large number of clips 90 can be charged by means of the clip seating holes 22.

Moreover, in the body part 10 including the supporting member 12 and the wheel cover member 16 and the wheel 20 charged with a large number of clips 90, a switching means, a driving means, a clip ejecting means, a wheel movement means, a switching releasing means, etc. which are required for automatically ejecting the clips 90 according to a need for binding documents, paper 100, etc., are included.

First, the switching means supplies power from a power unit (not shown) to the apparatus by means of battery, etc. as a contact part 33 included in the opening 14 is pressed by external force. The switching means is roughly shaped like "┘" and the contact part 33 formed at one end thereof in such a manner that it is positioned in the side of the opening 14 of the body part 10, and has a touch lever 32, which is formed at one side of the body of the switching means and has an elongated hole 32*a*, which allows a guide protuberance 11 formed at the body part 10 to extend through the elongated hole. A switching lever 34 is fixedly assembled with the touch lever 32. The switching lever 34 is roughly shaped like a bar and has one end, which is shaped like "┴" and has a locking groove 35 formed thereon, and an upper end, with which a secondary lever 74 included in the switching releasing means selectively makes contact.

Also, a switch 30, which has a lever 31, which is selectively switched by a primary lever 72 included in the switching release means when the switching lever 34 moves forward and backward, is included at a position spaced a predetermined distance from the end part of the switching lever 34. The switching lever 34 is fixedly assembled with one end of a return spring 48 having the other end fixed in a partition wall 24 of the wheel 20 so that the touch lever 32 and the switching lever 34 can be simultaneously returned to each original position when the switched state is released.

The driving means includes a driving motor 40, which is formed at one side of the partition wall 24 within the wheel 20 having a circular shape and is selectively driven by power applied through the switching means. A driving gear 44, which is connected by means of a plurality of reduction gears 42 and is rotated by receiving driving force of the driving motor 40 at a speed reduced through the reduction gears 42, is installed at the driving motor 40. Also, one end of an arm 46 is assembled with one side of the driving gear 44.

The clip ejecting means includes: a spar gear 50, which is assembled with a spar gear box 50*a* assembled with one end of an arm 46 installed at the driving gear 44 and performs a linear movement; a fixed gear 52 installed at an upper side of the spar gear in a state where it is engaged with the spar gear 50; and a pushing rack gear 54, which is installed at a lower side of the spar gear in a state where it is engaged with the spar gear 50 and performs linear movement in such a manner that it is interlocked with the spar gear 50 so that an end of the pushing rack gear presses the clip 90 charged in a position corresponding to the opening 14, thereby performing a binding operation.

The wheel movement means includes: a pole movement bar 60, which is shaped like a bar having locking jaws 60*a* and 60*b* formed at the front and rear ends of an upper surface thereof and is installed at a lower side of the pushing rack gear 54 so that the pole movement bar performs linear movement in such a manner that it is interlocked with the pushing rack gear 54 by means of a protuberance 56 formed at a lower surface of the pushing rack gear 54; a pole 62, which is installed at a lower side of the rear end of the pole movement bar 60 and moves the wheel 20 in such a manner that an end of the pole is locked in one of latch grooves 66 of the wheel 20 while interlocking with the pole movement bar 60 performing a linear movement; and a spring 64, which is installed at an end side of the pole 62 so as to provide elastic force applied in an upper direction.

Also, the switching releasing means includes a cam 70, which is installed at the other side of the partition wall 24, which corresponds to the driving gear 44, and is interlocked with the driving gear. Also, a recess part 70*a* is formed at a part of an outer circumferential surface of the cam 70 with a predetermined depth. Therefore, a pair of latches, which include the primary lever 72 and the secondary lever 74 having a “|”-shape or a “L”-shape, respectively, makes contact with an outer circumferential surface of the cam 70 rotating while interlocking with the driving gear 44 so that the switching means is selectively converted to the off-state in such a manner that the primary lever 72 and the secondary lever 74 move through the recess part 70*a* when the cam 70 is rotated.

At this time, contact protuberances 72*a* and 74*a* are formed at the ends of the primary and second levers 72 and 74, which constitute a pair of latches making contact with the recess part 70*a* of the cam 70, respectively. Also, a locking protuberance 73*a*, which is stopped by the locking groove 35 of the switching lever 34, and a switching protuberance 73*a* making contact with the lever 31 of the switch 30 are formed at the other end of the primary lever 72. A contact protuberance 75, which makes contact with an upper end of the switching lever 34, is formed at the other end of the secondary lever 74.

Moreover, a plurality of backlash preventing grooves 82 are formed along an outer circumferential surface of the wheel 20 with a predetermined interval between them, and a backlash preventing member 80, which is selectively assembled with each backlash preventing groove, is installed at one side of the outer circumferential surface of the wheel cover member 16 in such a manner that the backlash preventing member 80 has a predetermined elastic force by means of a spring 80*a* so that backlash of the wheel 20 can be prevented.

Meanwhile, the driving motor 40 included in the driving means is controlled to be stopped after rotating only one time when binding is required one time through the opening 14 of the body part 10. At this time, the driving gear 44 connected with the driving motor 40 is accurately rotated one time according to one-time rotation of the driving motor 44 so that one clip 90 is used when binding is requested one time.

Figure 5:
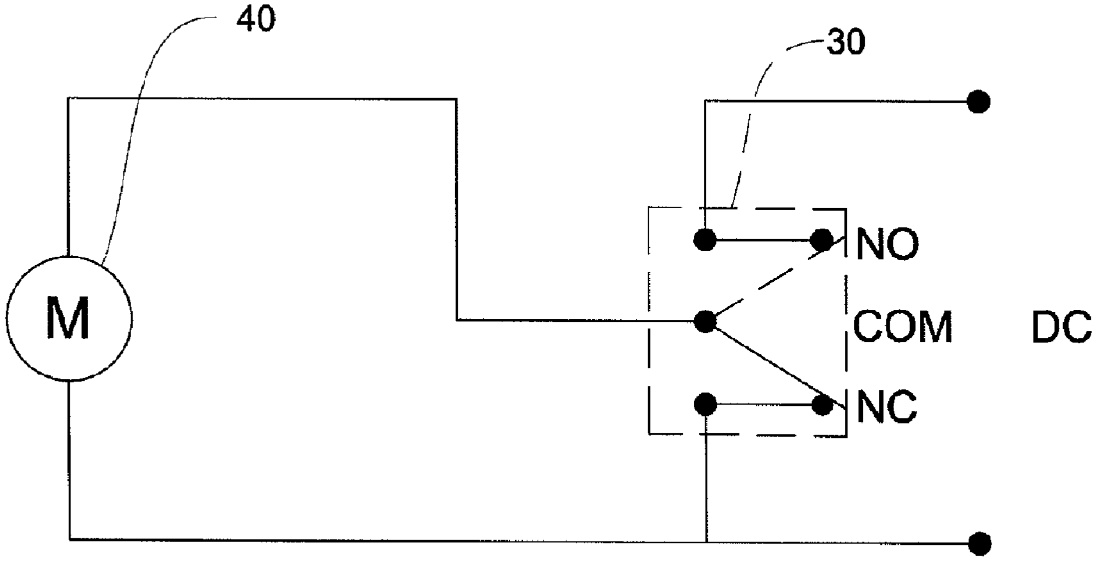
FIG. 5 is a circuit diagram of a switching embedded in an electro-motion type automatic clip-ejecting apparatus according to the present invention.

In order to achieve this, as shown in FIG. 5, the driving motor 40 uses the structure of a small sized DC.

That is, when the lever of the switch is changed into the ON-state, a COM is converted to a No-position so that electric current is applied. Meanwhile, when the lever of the switch is changed into the OFF-state, the COM again makes contact with an NC so that both poles of the motor is electrically connected with each other, and thus magnetic generation occurs due to an inner magnet of the motor, and the force of the generation functions as a brake so that rotation of the motor is immediately stopped.

Subsequently, the operation of the present invention structured as described above will be described below.

First, in order to bind paper 100, such as a predetermined number of documents, etc. by using the electro-motion type automatic clip-ejecting apparatus according to the present invention, an opening/closing member 18 included in the wheel cover member 16 of the body part 10, and each clip 90 is positioned within the clip seating hole 22 of the wheel 20 so that a large number of clips are charged into the wheel 20.

Then, when the paper 100, such as a predetermined number of documents, etc, to be bound is inserted into the opening 14 formed at one side of the body part 10, the paper 100 presses the contact part 33 of the touch lever 32 so as to move the touch lever 32 frontward to the inner side of the wheel 20. Accordingly, the switching lever 34 assembled with the touch lever 32 is interlocked with the touch lever so that the switching lever 34 presses the lever 31 of the switch 30 while moving forward to the inner side of the wheel 20 so as to allow the switch to be in an ON-state.

Thus, as the switch 30 is converted to the ON-state, power is provided to the driving motor 40 from the power unit so as to operate the driving motor 40. Therefore, the rotational force of the driving motor allows the driving gear 44 to be rotated at a reduced speed through a plurality of reduction gears 42. As a result, a spar gear box 50*a* performs linear movement by means of the arm 46 assembled with the driving gear 44.

The spar gear 50 assembled with the spar gear box 50*a* moves forward while rotating in a state where it is engaged with the fixed gear 52, and, simultaneously, a pushing rack gear 54 engaged with a lower side of the spar gear 50 moves forward in a direction equal to a progressing direction of the spar gear 50 two times as much as a distance where the spar gear 50 progresses, thereby pressing a rear surface of a corresponding clip 90 charged in the clip seating hole 22. At this time, the front part of the clip 90 is widened by the leaf spring 14*a* shaped like V so as to bind paper 100 positioned at the opening 14.

At this time, when the pushing rack gear 54 moves forward, the protuberance 56 integrally formed at a lower side of the pushing rack gear also moves forward. Therefore, the pole movement bar 60 moves forward in such a manner it is interlocked with the push rack gear through the locking jaw 60*a* formed at a front end of the pole movement bar 60. As a result, a pole 62 assembled with a rear end of the pole movement bar 60 moves forward together with the pole movement bar 60 so that an end blade of the pole 62 is moved to one of latch grooves 66 near the end blade.

Moreover, when the pushing rack gear 54 moves backward, the protuberance 56 formed at the lower side of the pushing rack gear 54 cases the pole movement bar 60 to be interlocked with the pushing rack gear by means of the locking jaw 60*b* of the rear end of the pole movement bar 60. Therefore, the pole 62 is interlocked with the latch groove 66 so that the wheel 20 is rotated a predetermined distance. As a result, the clip 90 charged in a position near the clip binding paper moves toward the opening 14 to be in a standby state.

At this time, the driving gear 44 is controlled to be accurately rotated only once so that only one clip 90 is used in binding according to each singly binding request.

Figure 4A:
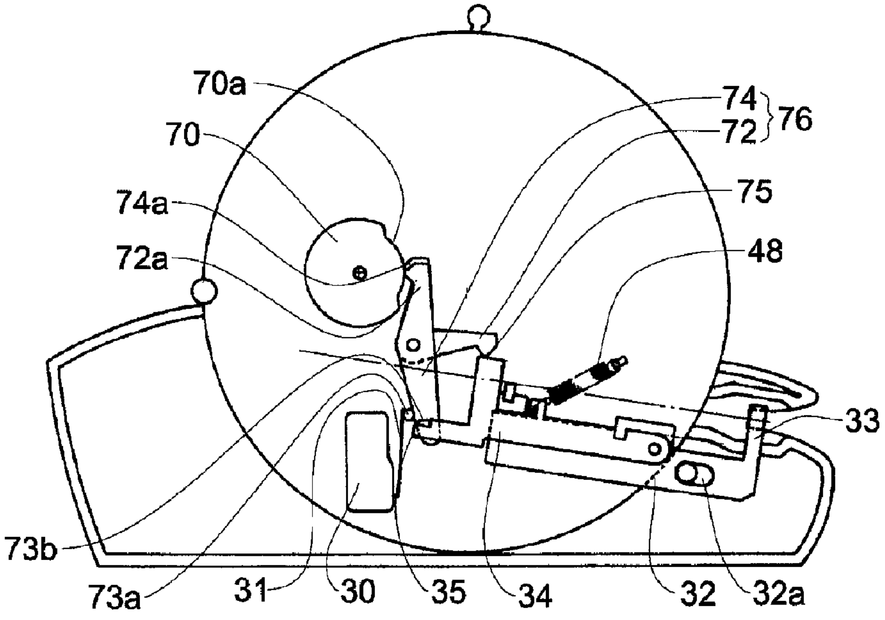
FIGS. 4*a* to 4*d* are sectional views of the other side of an electro-motion type automatic clip-ejecting apparatus according to the present invention in the operational state.
Figure 4B:
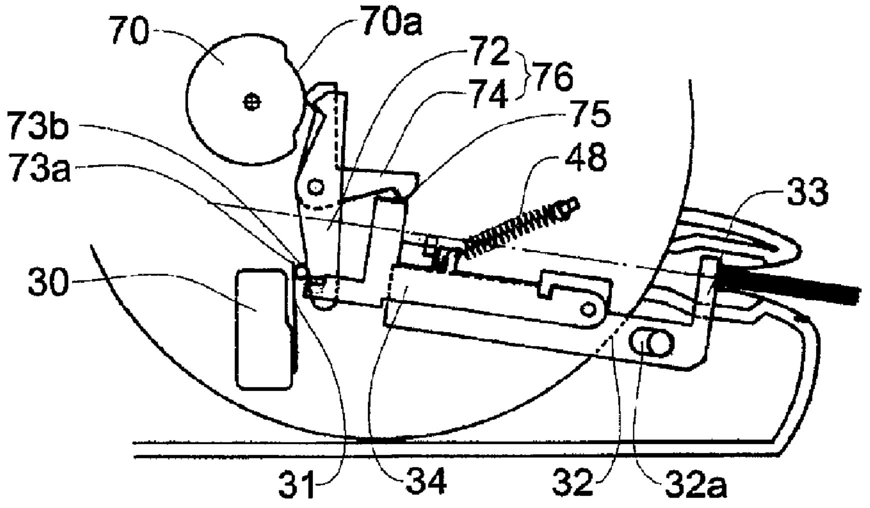

That is, the operation is described with reference to FIGS. 4*a* and 4*b*. The switch 30 maintains an off-state in a binding-standby state as shown in FIG. 4*a*. When paper 100 to be bound is inserted through the opening 14 as shown in FIG. 4*b*, the paper 100 presses the contact part 33 so that the touch lever 32 and the switching lever 34 are simultaneously pressed. As a result, the primary lever 72 of the pair of latches is interlocked so that the lever 31 of the switch 30 is pressed to turn on the switch 30. Accordingly, the driving motor 40 is operated to apply rotational force to the driving gear 44 connected with the plurality of reduction gears 42.

Also, according to the rotation of the driving gear 44, the cam 70 installed at a position corresponding to the driving gear through the partition wall 24 is simultaneously rotated. At this time, the contact protuberances 72*a* and 74*a* of the primary and secondary latches 72 and 74, which are in contact with the recess part 70*a* of the cam 70, are pushed by a protruding part of the cam 70 so that the contact protuberance 75 of the secondary lever 74 presses an upper part of the switching lever 34. As a result, the locking groove 35 in contact with the locking protuberance 73*b* positioned at the lower end of the first lever 72 escapes from the locking protuberance 73*a* (see FIG. 4*c*).

Figure 4C:
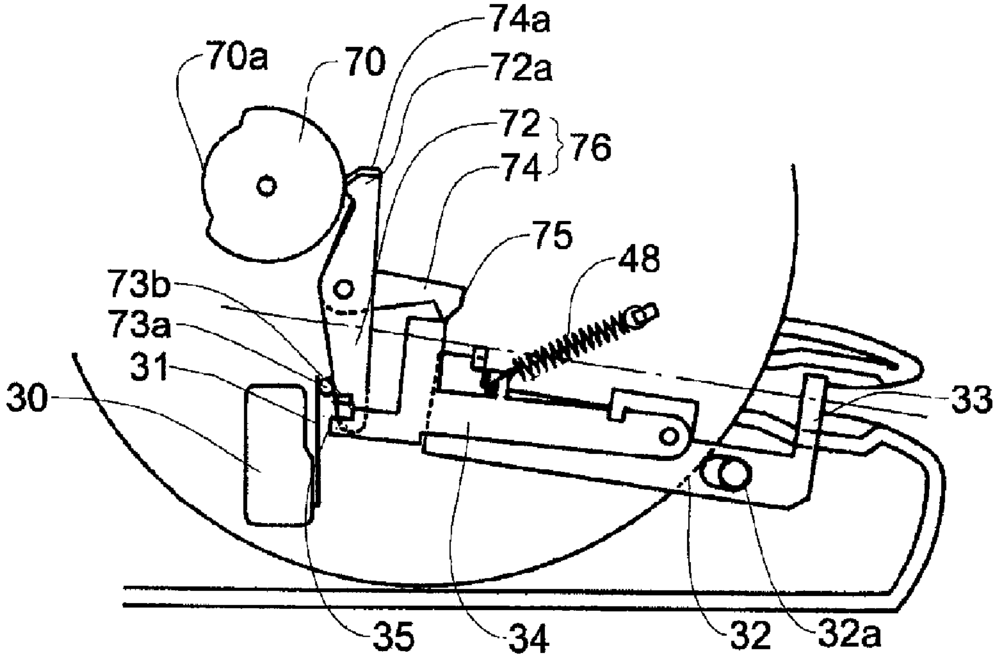
Figure 4D:
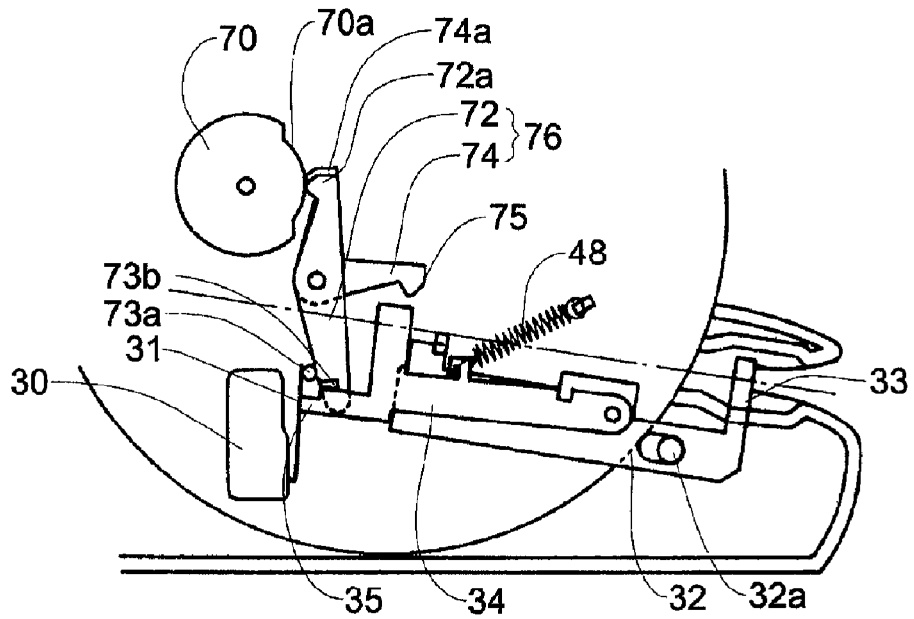

Then, as shown in FIG. 4*d*, the primary lever 72 and the secondary lever 74 are returned to each original position as the cam 70 is retuned to its original position. Therefore, the lever 31 of the switch 30, which has been pressed by the switching protuberance 73 of the primary lever 72, is returned to its original position so that the switch 30 is turned off.

At this time, the switching lever 34, the touch lever 32, and the secondary lever 74 maintain restoration force due to the return spring 64, and the primary lever 72 can maintain restoration force due to the lever 31 of the switch 30.

Also, as described above, after the paper 100 inserted through the opening 14 has been completely bound by the clip, although the paper 100 hasn't been extracted from the opening 14, the lever 31 of the switch 30 is returned to its original position in a state where the touch lever 32 has been pressed as shown in FIGS. 4*c* and 4*d* so that it is possible to maintain the OFF-state of the switch 30.

Also, when the bound paper 100 is extracted from the opening 14, the touch lever 32 moves back by the return spring 46. Therefore, the switching lever 34 moves backward through interlocking so that the locking protuberance 73*b* positioned at the lower end of the primary lever 72 is locked in the locking groove 35 of the switching lever 34. As a result, a clip is positioned in a binding-standby state.

Meanwhile, other modified embodiments different from the embodiment described in the present invention are possible without departing from the spirit or prospect of the present invention.

In the electro-motion type automatic clip-ejecting apparatus, which is structured as described above, according to the present invention, when paper to be bound is inserted into the apparatus after a large number of clips are charged in the clip magazine, each clip is simultaneously ejected from the clip magazine so that a binding operation is performed. Therefore, it is possible to conveniently use the clip ejecting apparatus by only one hand of the user, thereby remarkably improving convenience in using the clip ejecting apparatus.

What is claimed is:

1. An electro-motion type automatic clip-ejecting apparatus capable of binding a plurality of pieces of paper inserted through an opening by using a plurality of clips charged within the apparatus, the apparatus comprising:

a body part including a supporting member, which is seated on a floor surface and has the opening formed at one end of the supporting member, the opening having a plate spring, and a wheel cover member, which has a circular shape, is installed at the supporting member, and has a clip ejecting hole communicating with the opening and an opening/closing member, which is selectively opened;

a wheel, which is installed within the wheel cover member in such a manner that the wheel is selectively rotated and has a plurality of clip seating holes for allowing a large number of clips to be charged within the wheel, the clip seating holes being formed along a body of the wheel;

a switching means for supplying power from a power unit to the apparatus as a contact part included in the opening is pressed by an external force;

a driving means installed on one side of a partition wall within the wheel, the driving means including a driving motor driven by power applied through the switching means, a plurality of reduction gears connected with the driving motor, and a driving gear, which is rotated by receiving driving force from the driving motor by means of the reduction gears and has one side connected with one end of an arm;

a clip ejecting means including a spar gear, which is assembled with a box assembled with another end of the arm and performs a linear movement, a fixed gear, which is fixedly installed on an upper side of the spar gear in a state where the spar gear is engaged with the fixed gear, and a pushing rack gear, which is installed on a lower side of the spar gear in a state where the pushing rack gear is engaged with the spar gear and performs a linear movement in such a manner that the pushing rack gear is interlocked with the spar gear, and allows an end of the pushing rack gear to press a clip charged in a position corresponding to the opening, thereby performing a binding action;

a wheel movement means including a pole movement bar, which is shaped like a bar having locking jaws formed at front and rear ends of an upper surface of the bar, is installed on a lower side of the pushing rack gear, performs a linear movement in such a manner that the pole movement bar is interlocked with the pushing rack gear by means of a protuberance formed at a lower surface of the pushing rack gear, a pole, which is installed on a lower side of a rear end of the pole movement bar, and is interlocked with the pole movement bar according to linear movement of the pole movement bar so that an end of the pole is locked with a latch groove of the wheel, thereby moving the wheel, a spring for providing elastic force applied toward an upper side, the spring is installed at the end of the pole; and a switching releasing means including a cam, which is installed at another side of the partition wall, which corresponds to the driving gear so as to be interlocked with the driving gear and has a recess part formed on an outer circumferential surface of one side of the cam, and a pair of latches, which is formed in such a manner that a primary lever shaped like "|" and a secondary lever shaped like "ㄴ" are overlapped with each other, and allows each end of the primary and secondary levers to makes contact with the outer circumferential surface of the cam so that each another end of the primary and secondary levers selectively converts the switching means to an OFF-state according to rotation of the cam.

2. The electro-motion type automatic clip-ejecting apparatus as claimed in claim of 1, wherein the switching means includes:

a touch lever, which is shaped like "ㅗ" and has a contact part formed at one end of the touch lever in such a manner that the contact part is positioned at a side of the opening and an elongated hole formed at a body of the touch lever so as to allow a guide protuberance to extend through the elongated hole;

a switching lever, which has one side positioned within the wheel in a state where the one end is assembled with the touch lever and another side, which is shaped like "ㅗ" and has a locking groove formed at one end of the another side of the touch lever and an upper end of the another side, which selectively makes contact with the secondary lever;

a switch having a lever formed at one side of the switching, the lever being selectively switched according forward/backward movement of the switching lever; and a return spring, which has both ends assembled with the partition wall of the wheel and the switching lever, respectively, so that the return spring releases a switched state and simultaneously allows the switching means to be retuned to its original position.

3. The electro-motion type automatic clip-ejecting apparatus as claimed in claim of 1, wherein a contact protuberance is formed at each end of the primary and secondary levers, which makes contact with the recess part of the cam, a switching protuberance, which make contact with a locking protuberance stopped by the locking groove of the switching lever and a switching protuberance making contact with the lever of the switch are formed at another end of the primary lever, and a contact protuberance, which makes contact with an upper end of the switching lever, is formed at another end of the secondary lever.

4. The electro-motion type automatic clip-ejecting apparatus as claimed in claim of 1, wherein the driving motor of the driving means is controlled to be rotated only once according to each single binding request, and thus, the driving gear connected with the driving motor is accurately rotated only once so that only one clip is used in binding according to each single binding request.

5. The electro-motion type automatic clip-ejecting apparatus as claimed in claim of 1, wherein a plurality of backlash preventing grooves are formed along an outer circumferential surface of the wheel with a predetermined interval, and a backlash preventing member, which is selectively assembled with each backlash preventing groove so as to prevent backlash of the wheel, is installed at one side of an outer circumferential surface of the wheel cover member.

* * * * *